United States Patent [19]

Watts

[11] Patent Number: 4,928,904
[45] Date of Patent: May 29, 1990

[54] GAP, OVERWIND, AND LEAD ANGLE SENSOR FOR FIBER OPTIC BOBBINS

[75] Inventor: Robert M. Watts, Harvest, Ala.

[73] Assignee: The Boeing Company, Seattle, Wash.

[21] Appl. No.: 253,761

[22] Filed: Oct. 5, 1988

[51] Int. Cl.[5] .............................................. B65H 54/28
[52] U.S. Cl. ................................. 242/158 R; 242/25 R
[58] Field of Search .................. 242/158 R, 36, 25 R; 356/73.1

[56] References Cited

U.S. PATENT DOCUMENTS

| | | | |
|---|---|---|---|
| 3,319,070 | 5/1967 | Schneider | 242/158 R |
| 3,814,348 | 6/1974 | Johnson | 242/158 R |
| 3,876,167 | 4/1975 | Nittschalk et al. | 242/158.4 R |
| 4,102,579 | 7/1978 | Stewart | 356/73.1 |
| 4,183,666 | 1/1980 | Tahara et al. | 356/73.1 |
| 4,215,937 | 8/1980 | Borsuk | 350/96.15 X |
| 4,410,147 | 10/1983 | Seibert | 242/158 R |
| 4,456,199 | 6/1984 | Seibert | 242/158 R |
| 4,480,798 | 11/1984 | Robinson et al. | 242/36 X |
| 4,535,955 | 10/1985 | Custer | 242/158 R |
| 4,570,875 | 2/1986 | Buluschek | 242/158 R |
| 4,655,410 | 4/1987 | Ruffin et al. | 242/158 R |
| 4,678,327 | 7/1987 | Yoshida et al. | 356/73.1 |
| 4,685,982 | 8/1987 | Kucheck | 156/64 |
| 4,746,080 | 5/1988 | Pinson | 242/18 R X |

Primary Examiner—Donald Watkins
Attorney, Agent, or Firm—Finnegan, Henderson, Farabow, Garrett & Dunner

[57] ABSTRACT

A position sensor for sensing the position of an optical fiber with respect to the axis of a bobbin as the fiber is being wound to the bobbin. The apparatus and method illuminate the fiber being fed onto a bobbin with an externally incident energy which is internally reflected within a portion of the fiber. The position of the illuminated portion of the fiber is detected and the winding process may be controlled based on the detected position. In alternate embodiments, multiple radiation sources produce radiation with distinctive radiation characteristics and multiple sensors discriminate between and distinct radiation characteristics.

18 Claims, 3 Drawing Sheets

GAP, OVERWIND, AND LEAD ANGLE SENSOR FOR FIBER OPTIC BOBBINS

BACKGROUND OF THE INVENTION

1. Field of the Invention

The present invention relates to an apparatus and related method of winding optical fiber onto a bobbin. More particularly, the invention relates to an apparatus and related method of winding optical fiber onto a bobbin which permits free streaming out of the fiber from the bobbin without clumping or knotting and which minimizes the effect on the optical signal passing through the fiber.

2. Description of the Prior Art

A number of weapons and communications systems have been developed or are under development which use an optical fiber for two-way data communication between two or more moving bodies or between a moving body and a fixed station. A typical optical fiber application involves packaging a continuous strand of optical fiber inside a vehicle with one end of the fiber being attached to operational devices in the vehicle, attaching the other end of the fiber to a control or communication station at the launch site, launching the vehicle, and conducting two-way communication with the vehicle during its flight.

It is important to provide a reliable and compact means for packaging the optical fiber in the vehicle which will minimize stresses on the fiber to preclude adverse effects on communication performance and which will permit reliable deployment of the fiber during flight of the vehicle. Thus, it is important that the optical fiber be smoothly wound onto the supply bobbin and that the windings be free of gaps or overwinds.

Many different methods and systems having been proposed for winding bobbins. For example, it has been attempted to ensure fiber optic bobbins free of irregularities by providing a high magnification closed circuit TV monitor continuously monitored by an operator to view the winding process. This has the disadvantages of high labor costs, and operator fatigue can result in winding flaws. It has also been attempted to measure laser energy which is reflected from the junction between turns of a plastic coated optical fiber. Although adequate for the purposes intended, in such a system false signals and reflectance changes may occur because of variations in the plastic coating. Further, because such a system measures the energy reflected from the junction between turns of the optical fiber, it is incapable of effectively handling fiber turns with deliberately broad gaps between them. It has also been proposed to provide an open loop system for winding bobbins with no flaw detection. This would require excessively high precision equipment and it would be difficult to achieve flexibility for a variety of bobbin configurations. In addition, such a system would not be fail safe.

Accordingly, it is an object of this invention to provide an improved method and apparatus to ensure accurate positioning of an optical fiber on a bobbin as the fiber is being wound onto the bobbin.

It is a further object of the present invention to provide a method and apparatus that senses the gap, overwind, and lead angle of an optic fiber being wound onto a bobbin.

Additional objects and advantages of the invention will be set forth in part in the description which follows, and in part will be obvious from the description or may be learned by practice of the invention. The objects and advantages of the invention may be realized and obtained by means of the instrumentalities and combinations particularly pointed out in the appended claims.

SUMMARY OF THE INVENTION

To achieve the objects and in accordance with the purpose of the invention, as embodied and broadly described herein, the apparatus and method for winding an optical fiber on a bobbin comprises means for winding an unwound length of an optical fiber back and forth a predetermined distance along the axial length of a bobbin. The apparatus also includes means for internally reflecting externally incident energy (means for transmitting energy into a fiber to be internally transmitted) through a selected portion of the fiber being wound and means for detecting the position of the selected portion of the optical fiber within said predetermined distance based on energy loss out of the fiber. Preferably, the apparatus also comprises means responsive to the detected position for controlling the winding means.

Also, in accordance with the present invention as embodied and broadly described herein, the external incident energy reflecting means (means for transmitting energy into the fiber to be transmitted through the fiber) comprises high loss external incident energy reflecting means for internally reflecting (transmitting) energy for which the fiber has a high loss characteristic through a first section of the fiber portion and low loss external incident reflecting means (second means) for internally reflecting (transmitting) energy for which the fiber has a low loss characteristic through a second section of the fiber portion. Preferably, the detecting means also comprises comparator means responsive to the position of the first and second sections for controlling the spacing of the fiber on the bobbin.

Also, in accordance with the present invention, as embodied and broadly described herein, a method of winding an optical fiber on a bobbin comprising winding an unwound length of an optical fiber back and forth a predetermined distance along the axial length of a bobbin. The method further includes internally reflecting external incident energy (transmitting energy into the fiber to be internally transmitted) through a selected portion of the fiber being wound. The method further includes detecting the position of the selected portion of the optical fiber within the predetermined distance based on the loss of energy out of the fiber. Preferably, the method also includes the step of controlling the winding process responsive to the detected position of the fiber.

The accompanying drawings which are incorporated in and constitute a part of this specification, illustrate embodiments of the invention and, together with the description, serve to explain the principles of the invention.

Figure 1:
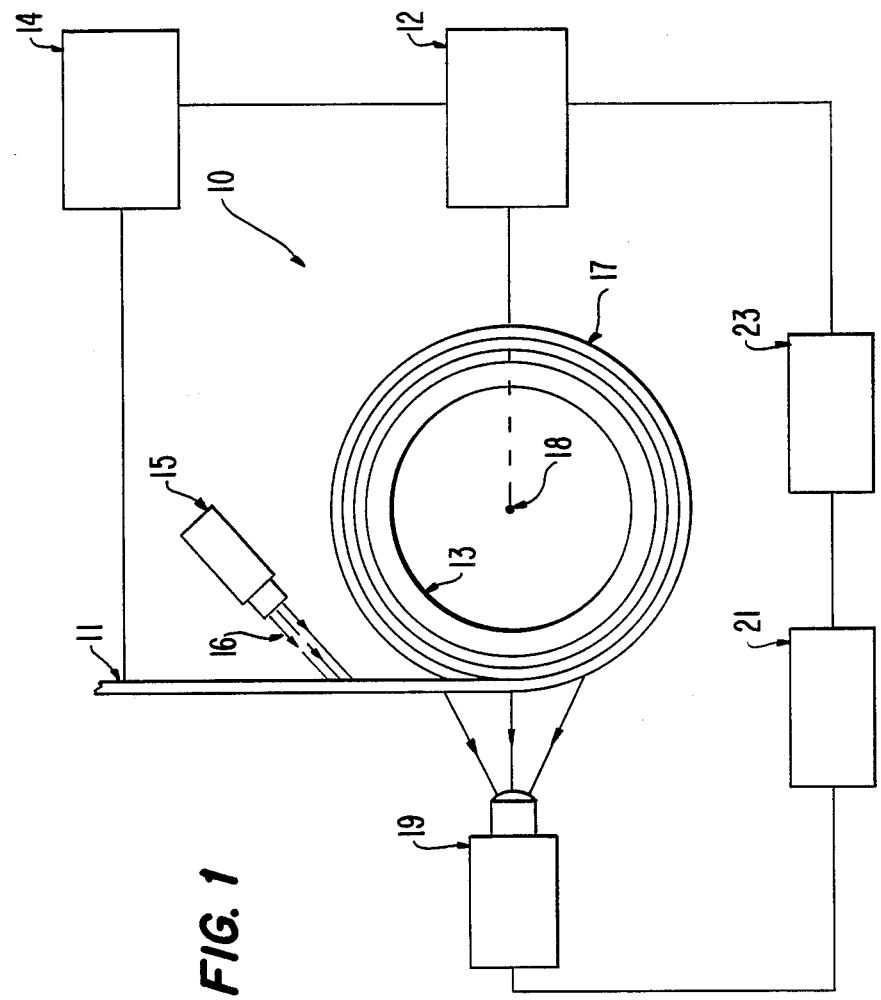
FIG. 1 is a schematic view of the apparatus for detecting the position of an optic fiber continuously fed onto a receiving bobbin in accordance with the teachings of this invention.

DESCRIPTION OF THE PREFERRED EMBODIMENTS:

Reference will now be made in detail to the present preferred embodiments of the invention, an example of which is illustrated in the accompanying drawings.

A preferred embodiment of the method and apparatus for winding an optical fiber onto a bobbin is represented generally by the numeral 10. An optic fiber 11 is continuously wound onto a receiving bobbin 13. In accordance with the present invention, the apparatus includes means for winding an unwound length of an optical fiber back and forth a predetermined distance along the axial length of the bobbin. As embodied herein, the winding means comprise bobbin winding mechanism 12 operatively connected to bobbin 13 and fiber 11. Bobbin winding mechanism 12 may be a mechanism as described in U.S. Pat. No. 4,746,080 entitled "Method of Winding Optical Fiber on a Bobbin," which is incorporated by reference herein. As embodied herein, the winding means also comprises means designated schematically as 14 for guiding the unwound length of the optical fiber at selected lead angles to the axis 18 of bobbin 13.

In accordance with the present invention, the apparatus further includes means for internally reflecting external incident energy (means for transmitting energy into the fiber to be transmitted) through a selected portion of the fiber being wound. As embodied herein, means for internally reflecting external incident energy includes a source of radiation 15 which produces an external incident energy beam, as illustrated by 16, which is transmitted into, and internally reflected within, a selected portion of the optic fiber to illuminate that portion of the fiber. The portion of the fiber illuminated by the externally incident energy (the portion through which energy is transmitted) is "self-illuminating" due to the less than complete internal reflections (transmissions) of the energy and the consequent escape (loss) or "leakage" of the reflected energy along the fiber. The externally incident energy can be visible light or infrared radiation, both of which can be either coherent energy (laser energy) of incoherent energy. An external energy source which has been found to provide such internal reflections is that made by Aerotech, Inc. and sold as model no. LSR2R. As embodied herein, the energy input into the optic fiber portion is tailored to escape from the fiber's sides around the last previous fiber turn 17 as illustrated in FIG. 1. The escape of the energy from the fiber is at least partially controlled by the angle of entry of the energy into the fiber.

In accordance with the present invention, the apparatus further includes means for detecting the position of the selected portion of the optical fiber within a predetermined distance. The detecting means, which also preferably detects the lead angle of the fiber, comprises position sensing means responsive to energy loss out of the fibers and image processing means. As embodied herein, the position sensing means includes position sensor 19 and the image processing means includes image processor 21 as illustrating in FIG. 1. Preferably, the position sensor can be a TV camera or other electro-optic position or image sensing device and is operative to sense lateral position and lead angle of a selected portion of the fiber. A position sensor found to perform the stated task is that made by Javelin Electronics, Co. and sold as model no. JE20621R. Image processor 21 may be a microcomputer programmed to discriminate between property positioned new turns of fiber and those which are improperly positioned.

As embodied herein, image processor 21 includes comparator means responsive to the position of the internally reflected portion (portion through which energy is transmitted) of the fiber being wound for controlling the spacing of the fiber on the bobbin and determining the location and condition of the fiber. It will be apparent to those skilled in the art that image processor 21 may be programmed in a variety of ways to determine if a new turn of fiber is properly positioned and if the fiber lead angle is correct. For example, the image processor may compare the location of the internally reflected portion of the fiber to a programmed predetermined reference point or to the location of another fiber portion which has previously been stored. In the event the detected fiber is improperly positioned on the bobbin, the image processor 21 may generate an error signal or other appropriate data corresponding to the sensed position and angle to control the winding means.

Preferably, the apparatus further comprises means responsive to the detected position for controlling the winding means. As embodied herein, the winding control means includes a winding mechanism controller 23 adapted to receive signals from image processor 21 of the detecting means for adjusting the winding mechanism, namely winding mechanism 12 and/or fiber guiding means 14 as embodied herein.

It is preferred to determine the position of the fiber being fed onto the bobbin relative to the previous adjacent turn so that gaps, overwinds and changes in the fiber lead angle can be detected. A gap may be defined as the space between the fiber being wound onto the bobbin and a previous adjacent turn of fiber. An overwind may be defined as fiber being fed onto the bobbin overlapping or being wound on top of a previous fiber turn in the same layer. Lead angle can be defined as the angle between the fiber being fed onto the bobbin and the axis of the bobbin.

Figure 2:
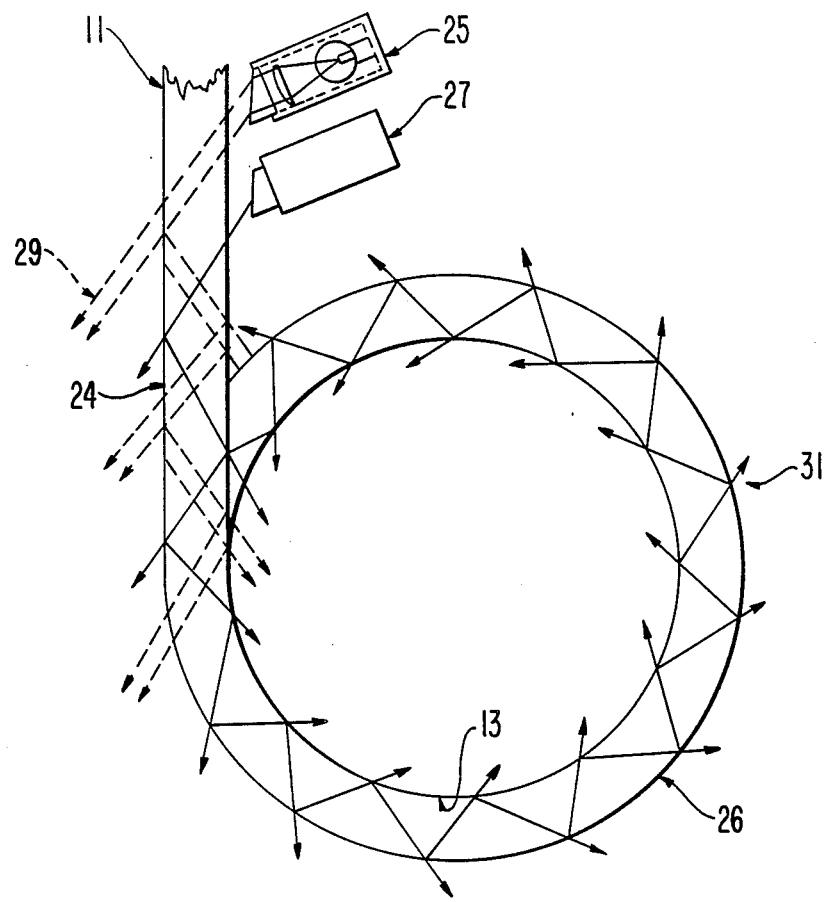
FIG. 2 is a schematic view of another embodiment of the detecting apparatus in accordance with the teachings of this invention.

FIG. 2 illustrates an alternative embodiment of the method and apparatus for winding an optical fiber onto a bobbin. In this embodiment, the external incident energy reflecting means (means for transmitting energy into the fiber to be internally transmitted through the fiber) comprises high loss external incident energy reflecting means (first means) for internally reflecting (transmitting) energy for which the fiber has a low loss characteristic through a first section of the fiber portion, and low loss external incident energy reflecting means (second means) for internally reflecting (transmitting) energy for which the fiber has a low loss characteristic through a second section of the fiber portion. As embodied herein, the high loss external incident energy reflecting means (first means) includes a high loss radiation source 25 as illustrated in FIG. 2. High loss radiation source 25 produces an externally incident energy beam 29 a part of which is transmitted into, and internally reflected within, section 24 of the optic fiber to illuminate that section as illustrated in FIG. 2. Preferably, section 24 illuminated by the high loss source is less than one turn of fiber on the bobbin and includes an unwound portion.

As embodied herein, the low loss external incident energy reflecting means (second means) includes a low loss radiation source 27 as illustrated in FIG. 2. Low loss radiation source 27 produces an externally incident energy beam 31 a part of which is internally reflected (transmitted) within section 26 of the optic fiber to illuminate that section as illuminated in FIG. 2. A lower proportion of the energy from the low loss radiation source 27 escapes per unit length of the fiber than that of the high loss radiation source 25 such that energy remains in the fiber to escape at a location significantly downstream of the input location, such as downstream location 31 in FIG. 2. Consequently, section 26 illuminated by the low loss radiation is greater than section 24 illuminated by the high loss radiation. The portion illuminated by the low loss radiation source is preferably greater than one full turn of fiber on the bobbin. Preferably, the second section of the fiber portion includes an unwound portion and a portion in wound physical contact with the bobbin.

It is generally preferred that the radiation sources 25 and 27 have either different wavelengths, different intensities, different radiation geometries or a combination of all three to effect the high loss/low loss distinction. In the embodiment shown in FIG. 2, the position and condition of the fiber 11 being wound on bobbin 13 is detected based on the illuminated portion of the optic fiber and discrimination between the characteristics of the wavelength emitted from the high and low loss radiation sources 25 and 27. The detection means may utilize one or more of the distinctive characteristics of the high loss and low loss radiation to determine the position of the fiber.

Figure 3:
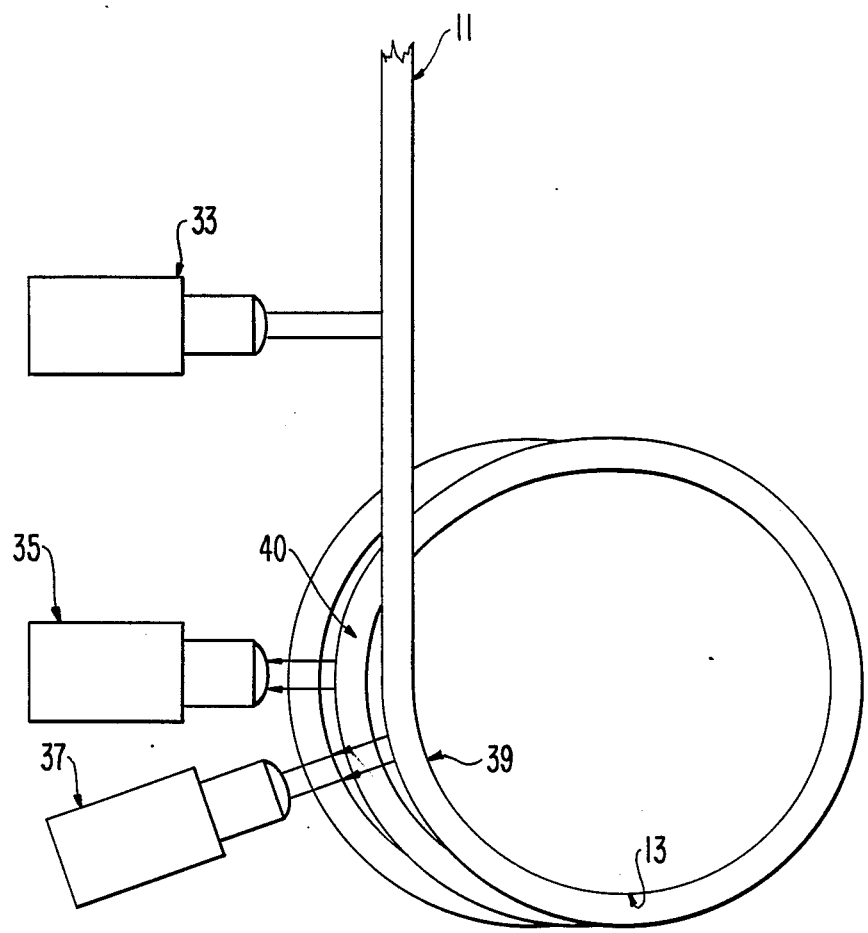
FIG. 3 is a schematic view of another embodiment of the detecting apparatus in accordance with the teachings of this invention.

FIG. 3 illustrates yet another embodiment of the method and apparatus of the present invention. In this embodiment the means for detecting the position of the selected portion of the fiber being wound comprises a plurality of position sensors. As embodied herein and illustrated in FIG. 3, three position sensors 33, 35 and 37 are adapted to monitor multiple positions of fiber 11 during the winding operation. Sensor 33 is positioned to view fiber 11 just prior to the position of the fiber's contact with bobbin 13, enabling sensor 33 to supply information in relation to the fiber's lead angle during the winding process. Sensor 37 is positioned to view fiber 11 after it settles onto the bobbin. Preferably, sensors 33 and 37 contain optical filters (not shown) which allow them to detect only the high loss radiation such as illustrated in FIG. 2. Sensor 35 is positioned to view the previous adjacent turn 40 of fiber 11 (shown displaced from bobbin 13, for illustration), but would also detect the new fiber turn. The combined information from sensor 37 and sensor 35 would indicate if gaps or overwinds exist in fiber 11. Preferably, sensors 33, 35 and 37 are TV cameras or other electro-optic position sensing devices.

It will be apparent to those skilled in the art that image processor 21 may be programmed in a variety of ways to determine if the fiber is properly positioned based on the input from sensors 33, 35 and 37. For example, the comparator means of the image processor may be programmed to compare the data from the sensor to predetermined reference points or to data generated and stored from previous input into the image processor.

In accordance with the present invention, the method for winding an optical fiber on a bobbin in a winding process includes continuously winding an unwound length of an optical fiber back and forth a predetermined distance along the axial length of a bobbin. As embodied herein, this can be accomplished by a bobbin winding mechanism as illustrated by 12 in FIG. 1. Further, in accordance with the present invention, the method includes the step of continuously internally reflecting (transmitting) external incident energy through a selected portion of the fiber being wound. As embodied herein, the interior of at least a portion of the fiber is illuminated by producing externally incident energy which is internally reflected (transmitted) to illuminate that portion of the fiber. As embodied herein and illustrated in FIG. 1, the selected portion of the fiber 11 can be illuminated by a single radiation source such as source 15, or preferably, by multiple sources of radiation having different characteristics, such as high and low loss sources 25 and 27 in FIG. 2.

In accordance with the present invention, the method further includes detecting the position of the selected portion of the optical within the predetermined distance based on energy loss out of the fiber. As embodied herein, this is accomplished by sensing the position of the illuminated portion of the fiber and comparing the sensed portion to a preprogrammed or generated reference source. The fiber position can be sensed by a single position sensor such as sensor 19 in FIG. 1. Or, preferably, multiple sensors such as sensors 33, 35, and 37 (FIG. 3) can advantageously be employed particularly when radiation sources of different characteristics are used. Preferably, this position sensor can be a TV camera or other electro-optic position sensing device. As embodied herein, the comparison step can be performed by an image processor 21.

In accordance with the present invention, the method further includes controlling the bobbin winding process responsive to the detected position of the fiber. As embodied herein, the bobbin winding process may be controlled by a winding mechanism controller 23 as illustrated in FIG. 1. Preferably, the step of winding an unwound length includes guiding the unwound length of the optical fiber at selected lead angles to the axis of the bobbin. Hence, it is also preferable that the step of detecting the position includes detecting the selected lead angles.

It is also contemplated that the apparatus and method can be accomplished with a single radiation source and a plurality of sensors, or a plurality of radiation sources and a single sensor, or a single sensor and a single radiation source, or any combination thereof. It will be apparent to those skilled in the art that other modifications and variations could be made in the apparatus for detecting the position of an optic fiber continuously fed onto a bobbin, and in the corresponding method, without departing from the scope or spirit of the invention.

What is claimed is:

1. An apparatus for winding an optical fiber on a bobbin, comprising:
    means for winding an unwound length of said optical fiber back and forth a predetermined distance along the axial length of said bobbin;
    means for transmitting energy into said fiber to be internally transmitted through a selected portion of said fiber being wound;
    means responsive to loss of said internally transmitted energy radially out of the longitudinal said selected portion of said fiber for detecting the position of said selected portion of said optical fiber within said predetermined distance; and
    means responsive to said detecting means for controlling said winding means.

2. The apparatus of claim 1 wherein said winding means comprises means for guiding said unwound length of said optical fiber at selected lead angles to the axis of said bobbin, and said position detecting means includes means for detecting the selected lead angles.

3. The apparatus of claim 1 wherein said means for transmitting energy into said fiber to be internally transmitted comprises:
   first means for transmitting energy of a first type for which said fiber has a high loss characteristic through a first section of said fiber portion;
   second means for transmitting energy of a second type for which said fiber has a low loss characteristic through a second section of said fiber portion; and
   wherein said detecting means includes means for discriminating between said first energy type and said second energy type.

4. The apparatus of claim 3 wherein said first section is an unwound portion and said second section includes an unwound portion and a portion in wound physical contact with said bobbin.

5. The apparatus of claim 1 wherein said position detecting means comprising position sensing means operative to sense lateral position and angle of said selected portion of said fiber, and image processing means responsive to said sensing means for generating data corresponding to the sensed position and angle for controlling said winding means.

6. The apparatus of claim 5, wherein said position sensing means comprise a plurality of sensors.

7. The apparatus of claim 6, wherein said plurality of sensors includes a first sensor to sense the position of said fiber immediately prior to the position of said fiber's contact with said bobbin, a second sensor to sense the position of said fiber after it settles onto said bobbin and a third sensor to sense the position of a previous adjacent turn of said fiber.

8. An apparatus for winding an optical fiber on a bobbin, comprising:
   means for winding an unwound length of said optical fiber back and forth a predetermined distance along the axial length of said bobbin;
   means for transmitting energy into said fiber to be internally transmitted through a selected portion of said fiber being wound comprising first means for transmitting energy of a first type for which said fiber has a high loss characteristic through a first section of said fiber portion, and second means for transmitting energy of a second type for which said fiber has a low loss characteristic through a second section of said fiber portion;
   means responsive to loss of said internally transmitted energy out of said selected portion of said fiber for detecting the position of said selected portion of said optical fiber within said predetermined distance, said detecting means including position sensing means including means for discriminating between said first energy type and said second energy type, for sensing the positions of said first and second sections, and comparator means for comparing the sensed positions with desired positions and generating a signal; and
   means responsive to said signal for controlling said winding means.

9. An apparatus for detecting the position of an optical fiber being continuously wound onto a receiving bobbin, the optical fiber having an unwound length, said apparatus comprising:
   means for transmitting energy selectively into said unwound length to be internally transmitted through a selected portion of said fiber being wound; and
   means responsive to loss of said internally transmitted energy radially out of the longitudinal surface of said selected portion of said fiber for sensing said selected portion.

10. The apparatus of claim 9 wherein said means for transmitting energy into said fiber to be internally transmitted comprises:
    first means for transmitting energy of a first type for which said fiber has a high loss characteristic through a first section of said fiber portion;
    second means for transmitting energy of a second type for which said fiber has a low loss characteristic through a second section of said fiber portion; and
    wherein said sensing means includes means for discriminating between said first energy type and said second energy type.

11. A method for winding an optical fiber on a bobbin in a winding process comprising:
    winding an unwound length of said optical fiber back and forth a predetermined distance along the axial length of said bobbin;
    transmitting energy selectively into said unwound length to be internally transmitted through a selected portion of said fiber being wound;
    detecting the position of said selected portion of said optical fiber within said predetermined distance in response to energy loss radially out of the longitudinal surface of said selected portion of said fiber from said internally transmitted energy; and
    controlling said winding process responsive to the detected position.

12. The method of claim 11 wherein
    the step of winding an unwound length back and forth a predetermined distance includes guiding said unwound length of said optical fiber at selected lead angles to the axis of said bobbin; and
    the step of detecting the position of the selected portion includes detecting the selected lead angles.

13. The method of claim 11 wherein the step of transmitting energy into said fiber to be internally transmitted comprises:
    internally transmitting energy of a first type for which said fiber has a high loss characteristic through a first section of said fiber portion;
    internally transmitting energy of a second type for which said fiber has a low loss characteristic through a second section of said fiber portion; and
    wherein detecting the position of said selected portion includes sensing the positions of said first and second sections including the step of discriminating between said first energy type and said second energy type.

14. The method of claim 11 wherein the step of detecting the position includes sensing the lateral position and angle of said selected portion of said fiber and generating data corresponding to the sensed position and angle for controlling said winding means.

15. A method for detecting the position of an optical fiber being continuously wound onto a receiving bobbin, the optical fiber having an unwound length, said method comprising:

transmitting energy selectively into said unwound length to be internally transmitted through a selected portion of said fiber being wound; and sensing the position of said selected portion of said optical fiber in response to energy loss radially out of the longitudinal surface said selected portion of said fiber from said internally transmitted energy.

16. The method of claim 16, wherein the step of transmitting energy into said fiber to be internally transmitted comprises:

internally transmitting energy of a first type for which said fiber has a high loss characteristic through a first section of said fiber portion;

internally transmitting energy of a second type for which said fiber has a low loss characteristic through a second section of said fiber portion; and wherein the step of sensing the position of the selected portion includes sensing the positions of said first and second sections including the step of discriminating between said first energy type and said second energy type.

17. The apparatus of claim 1, wherein said detecting means includes position sensing means for sensing the position of said selected portion and comparator means for comparing the sensed position with desired positions and generating a signal, and wherein said controlling means is responsive to said signal.

18. The method of claim 11, wherein the step of detecting the position of said selected portion includes sensing the position of said selected portion, comparing the sensed position with desired positions, and generating a signal, and wherein the step of controlling the winding process is responsive to said signal.

* * * * *

UNITED STATES PATENT AND TRADEMARK OFFICE
CERTIFICATE OF CORRECTION

PATENT NO. : 4,928,904

DATED : May 29, 1990

INVENTOR(S) : Robert M. Watts

It is certified that error appears in the above-identified patent and that said Letters Patent is hereby corrected as shown below:

Column 6, line 59, "fiber" should be --unwound length--; and
    line 63, "longitudinal" should be followed by --surface of--.

Column 9, line 6, "surface" should be followed by --of--; and
    line 8, "Claim 16" should be --Claim 15--.

Signed and Sealed this

Sixth Day of August, 1991

Attest:

HARRY F. MANBECK, JR.

*Attesting Officer*   *Commissioner of Patents and Trademarks*